United States Patent
Henderer et al.

(10) Patent No.: US 7,147,939 B2
(45) Date of Patent: Dec. 12, 2006

(54) COATED CARBIDE TAP

(75) Inventors: Willard E. Henderer, Evans, GA (US); Anakkavur T. Santhanam, Monroeville, PA (US); Sadayuki Akaki, Fukushima (JP)

(73) Assignees: Kennametal Inc., Latrobe, PA (US); Yamawa Manufacturing Ltd., Tokyo (JP)

( * ) Notice: Subject to any disclaimer, the term of this patent is extended or adjusted under 35 U.S.C. 154(b) by 0 days.

(21) Appl. No.: 10/375,299

(22) Filed: Feb. 27, 2003

(65) Prior Publication Data

US 2004/0170872 A1    Sep. 2, 2004

(51) Int. Cl.
*B23G 1/00*    (2006.01)
(52) U.S. Cl. .............. 428/698; 76/117; 428/408; 428/472; 428/701; 428/702; 428/704
(58) Field of Classification Search ............ 428/698, 428/469, 472, 704, 408, 701, 702, 697, 699; 408/215; 75/243, 245; 76/117
See application file for complete search history.

(56) References Cited

U.S. PATENT DOCUMENTS

| | | | | |
|---|---|---|---|---|
| 3,882,579 A | * | 5/1975 | Peacock ..................... 76/115 |
| 3,900,592 A | * | 8/1975 | Kennedy et al. ............. 427/569 |
| 4,054,426 A | * | 10/1977 | White |
| 4,204,886 A | * | 5/1980 | Bens |
| 4,643,951 A | * | 2/1987 | Keem et al. ................. 428/698 |
| 4,680,218 A | * | 7/1987 | Kimura et al. ............. 428/195.1 |
| 4,708,542 A | * | 11/1987 | Emanuelli ................... 408/219 |
| 4,826,365 A | * | 5/1989 | White ....................... 76/108.6 |
| 5,268,216 A | * | 12/1993 | Keem et al. |
| 5,327,806 A | * | 7/1994 | Houser .................. 76/DIG. 11 |
| 5,374,471 A | * | 12/1994 | Yoshimura et al. .......... 428/472 |
| 5,487,626 A | * | 1/1996 | Von Holst et al. ........... 408/222 |
| 5,580,196 A | | 12/1996 | Thompson ................... 418/145 |
| 5,619,000 A | * | 4/1997 | Ederyd et al. ................ 75/240 |
| 5,701,578 A | | 12/1997 | Liu ............................ 428/565 |
| 5,762,538 A | * | 6/1998 | Shaffer ....................... 408/227 |
| 5,942,318 A | * | 8/1999 | Soderberg et al. .......... 428/698 |
| 5,965,253 A | * | 10/1999 | Rechberger et al. |
| 6,071,469 A | * | 6/2000 | Rohlin et al. ................. 419/14 |

(Continued)

FOREIGN PATENT DOCUMENTS

EP    1266979    12/2002

(Continued)

*Primary Examiner*—Archene Turner
(74) *Attorney, Agent, or Firm*—Larry R. Meenan

(57) ABSTRACT

A coated carbide tap comprises a substrate consisting of tungsten carbide cemented with 12 to 16% by weight cobalt with additions of small amounts of transition metal carbides added to restrain grain growth, and may also contain low levels of impurities that might be picked up during processing. The substrate is coated with a layer of metal nitrides, carbides, carbonitrides, borides and/or oxides, the metal being chosen from one or more of the following: aluminum, silicon and the transition metals from Groups IV*a*, V*a*, and VI*a* of the Periodic Chart. The coating may comprise a monolayer and/or alternating layers optionally with varying chemical composition. To reduce friction, a top outer layer comprised of molybdenum disulphide; molybdenum disulphide and transition metals, or any combination thereof; carbon; carbon and transition metal carbides, or any combination thereof; carbon and a transition metal, or any combination thereof; and/or carbon nitride may be either co-deposited as a single layer or deposited in multiple or alternating layers to the coating. The coated carbide tap of the invention can be used at cutting speeds at least three times faster than conventional taps without chipping or breaking the tap.

20 Claims, 5 Drawing Sheets

U.S. PATENT DOCUMENTS

| | | | |
|---|---|---|---|
| 6,077,596 A * | 6/2000 | Hashimoto et al. .......... | 428/699 |
| 6,086,980 A * | 7/2000 | Foster et al. ................ | 407/119 |
| 6,103,357 A * | 8/2000 | Selinder et al. ............. | 428/698 |
| 6,213,692 B1 * | 4/2001 | Guehring et al. ........... | 408/223 |
| 6,220,797 B1 * | 4/2001 | Ishii et al. .................. | 407/119 |
| 6,221,479 B1 * | 4/2001 | Waldenstrom et al. ....... | 51/309 |
| 6,284,366 B1 * | 9/2001 | Konig et al. | |
| 6,511,265 B1 * | 1/2003 | Mirchandani et al. ...... | 408/223 |
| 6,521,349 B1 * | 2/2003 | Konig et al. ................ | 428/469 |
| 6,528,171 B1 * | 3/2003 | Endler et al. ............... | 428/469 |
| 6,655,882 B1 * | 12/2003 | Heinrich et al. ............ | 408/144 |
| 6,669,747 B1 * | 12/2003 | Salmon ....................... | 51/307 |
| 6,685,573 B1 * | 2/2004 | Hikosaka et al. ........... | 408/222 |
| 6,858,333 B1 * | 2/2005 | Henderer .................... | 428/698 |
| 6,884,499 B1 * | 4/2005 | Penich et al. ............... | 428/216 |

FOREIGN PATENT DOCUMENTS

| | | | |
|---|---|---|---|
| GB | 660129 | * | 10/1951 |
| JP | 2001316800 | * | 11/2001 |
| WO | 99/55929 | * | 11/1999 |

* cited by examiner

US 7,147,939 B2

COATED CARBIDE TAP

CROSS-NOTING TO RELATED APPLICATION

This application is related to U.S. patent application Ser. No. 10/267,387, filed on Oct. 9, 2002, entitled "TOOL WITH WEAR RESISTANT LOW FRICTION COATING AND METHOD OF MAKING THE SAME," the entire contents of which are incorporated herein by reference.

BACKGROUND OF THE INVENTION

1. Field of the Invention

This invention relates to cutting tools. More particularly, this invention relates to a coated carbide tap for threading steels and other ferrous based alloys.

2. Description of the Related Art

It is well known that cutting tools generate temperatures that are high enough to limit the life of the tool, thereby reducing the useful cutting speed. There exists a variety of materials used to manufacture cutting tools. Cutting tools are often manufactured from a class of tool steels known as high-speed steels. Although high-speed steels have excellent strength and toughness, they have only moderate resistance to temperature compared to materials that are more refractory.

Cemented tungsten carbide is favored as a material for manufacturing cutting tools over tool steels such as high-speed steel owing to properties such as higher hardness and high temperature stability including the ability to retain hardness at high cutting temperatures. Typically cutting tools manufactured from cemented carbide can be used at cutting speeds that are at least three times higher than tools manufactured from "high-speed" steel and the life of the tool is longer. However, cemented tungsten carbide has lower fracture toughness and strength than high-speed steel and this limits its use in some machining operations.

One of the machining operations that is used to generate an internal screw thread is known as tapping. There currently exist two tapping methods. The dominant tapping method is by cutting and removing material from the walls of a hole to produce a V-shaped helical screw thread. Alternatively, internal screw threads can be created by displacing material to form an internal screw thread. However, forming taps require much higher power than cutting taps and produce an imperfect thread crest at the thread's minor diameter. For this reason, cutting taps are often preferred over forming taps.

Unlike most other cutting tools used, for example, in turning, milling, drilling and reaming, tapping tools have relatively weak cross sections and additionally the cutting edges are weak. For this reason, taps manufactured from cemented carbide according to current technology have only very limited use. When carbide taps of current designs are used, cutting edges chip or fracture easily, rendering the tool useless, even in relatively easy to machine materials, such as steel. For this reason, carbide taps of the current technology are limited to tapping materials that are even easier to cut than steel, such as aluminum and cast iron. Steel and other ferrous based alloys are the most frequently used material for assemblies requiring screw threads. Therefore, a tap manufactured from cemented tungsten carbide would find advantages in comparison to taps manufactured from high-speed steel if the cutting edge chipping and breakage problems could be overcome.

Cemented carbide grades consisting of tungsten carbide alloyed with other carbides, such as tantalum carbide, titanium carbide and niobium carbide in amounts over approximately 3% by weight have high wear resistance when used as a tool material for cutting steel and other ferrous based alloys. However, such carbide grades do not have sufficient strength and toughness to be used as a material for taps. Alternatively, grades containing principally tungsten carbide cemented with cobalt in concentrations over 10% by weight have high strength, but their wear resistance is low in steel machining, and therefore they are not suitable as a tool material for tapping steel.

SUMMARY OF THE INVENTION

Briefly, according to this invention, there is provided a tap made of a tool material comprised of tungsten carbide cemented with cobalt in a range between about 12 to 16% by weight and coated with metal nitrides, carbides, carbonitrides, borides and/or oxides, wherein the metal is chosen from one or more of the following: aluminum, silicon and the transition metals from Groups IVa, Va, and VIa of the Periodic Chart.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
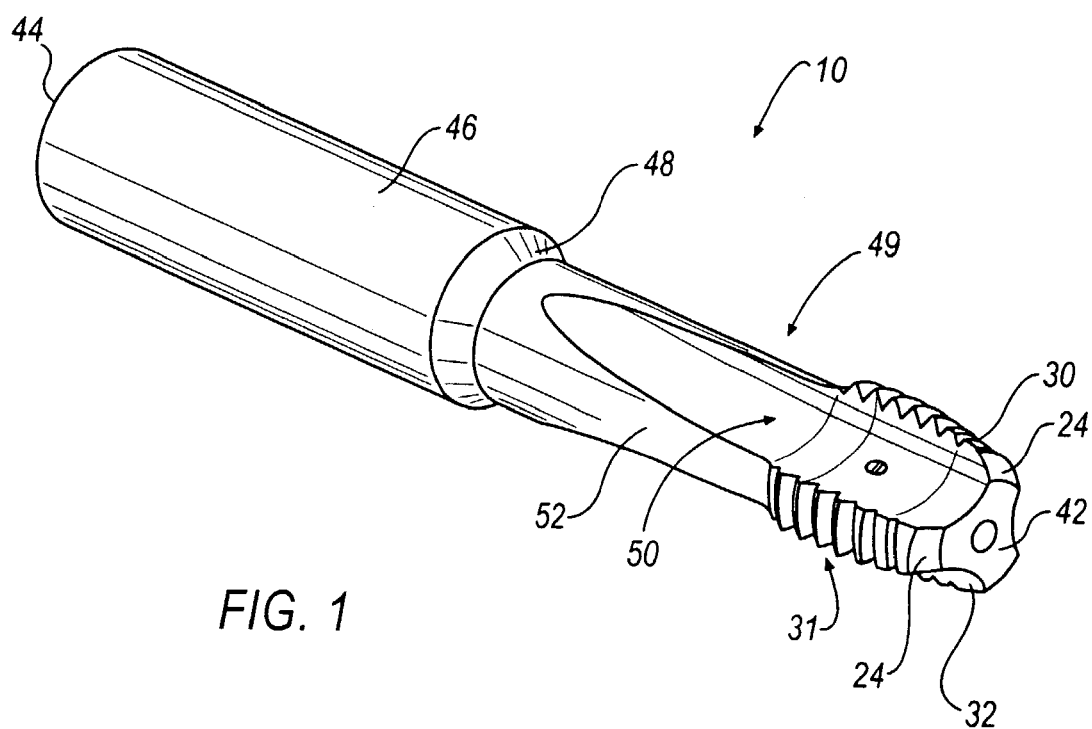
FIG. 1 is a perspective view of a coated carbide tap according to an embodiment of the invention.

Referring now to FIG. 1, a precision carbide cemented threading tap, shown generally at 10, is illustrated according to an embodiment of the invention. The tap 10 is manufactured from a cylindrical sintered tungsten carbide blank frequently referred to as a substrate 16 (FIGS. 2–8). The blank has a diameter that is sized larger than the finished dimensions of the tap 10 and is cut to length on surfaces 42 and 44.

A typical material for the substrate 16 is tungsten carbide cemented with cobalt. The amount of cobalt can range between about 12 weight percent to about 16 weight percent. In addition, small amount of transition metal carbides may be added to restrain grain growth, and the substrate 16 may also contain low levels of impurities that might be picked up during processing.

The first step in processing the substrate 16 is to grind the blank to precision cylindrical tolerances by methods such as cylindrical traverse grinding on centers or by centerless infeed grinding methods. During this step, the shank surface 46 is ground to size and the major diameter of the threaded section 31 is formed. Additionally during this process, or as a consequence of an additional process, the optional neck portion 49 may be created with a cylindrical surface 52 and a bevel 48 between the cylindrical shank 46 and the neck portion 49. Additionally, an optional bevel 24 may be ground by cylindrical grinding. The diameter of the shank 46 is approximately equal to the nominal thread diameter.

It should be appreciated that other options for the shank are possible. For example on large diameter taps, the shank may be smaller than the nominal thread diameter; and for small diameter taps, the shank diameter may be larger than the nominal thread diameter. Additionally, the tap may have a square on the extreme shank end of the tap for the purpose of driving it during use.

In the next step, one or more flutes 50 are ground so as to provide cutting edges, in combination with the chamfer 30, and a means for evacuating chips that form when the tap is used. As illustrated in FIG. 1, the flutes 50 are straight and generally oriented parallel to the axis of the tap 10. It should be realized that other flute orientations are possible. For example, short flutes may be ground at a 5 to 20 degree angle to the longitudinal axis of the tap 10 at the entry section of the tap in order to force the chips ahead of the motion of the tap during use. Alternatively, the flutes 50 may be helical, the helical rotation selected according to whether it is desirable to pull chips out of the hole or push chips ahead of the motion of the tap during use.

In the next step, the threaded body section 31 is ground to form V-shaped thread flank surfaces, along with minor and major diameters, on a helix. Subsequently, the shape of the cutting chamfer 30 is formed by grinding. The V-shaped thread flank surfaces and major diameter replicate the internal screw thread that is generated during tapping. The cutting chamfer 30 is tapered so as to allow entry in the hole to be tapped.

The above description of a certain number of basic steps characterizes the processing to arrive at the tap 10 of FIG. 1. However, it should be appreciated that the processing may take any number of suitable steps. The use of the above-described basic steps is for ease of description. Thus, the scope of the invention is not limited to the specific processing steps set forth above.

The next step is to coat the tap 10 with a wear resistant layer 54 comprised of metal nitrides, carbides, carbonitrides, borides and/or oxides, wherein the metal is chosen from one or more of the following: aluminum, silicon and the transition metals from Groups IV$a$, V$a$, and VI$a$ of the Periodic Chart.

Figure 2:
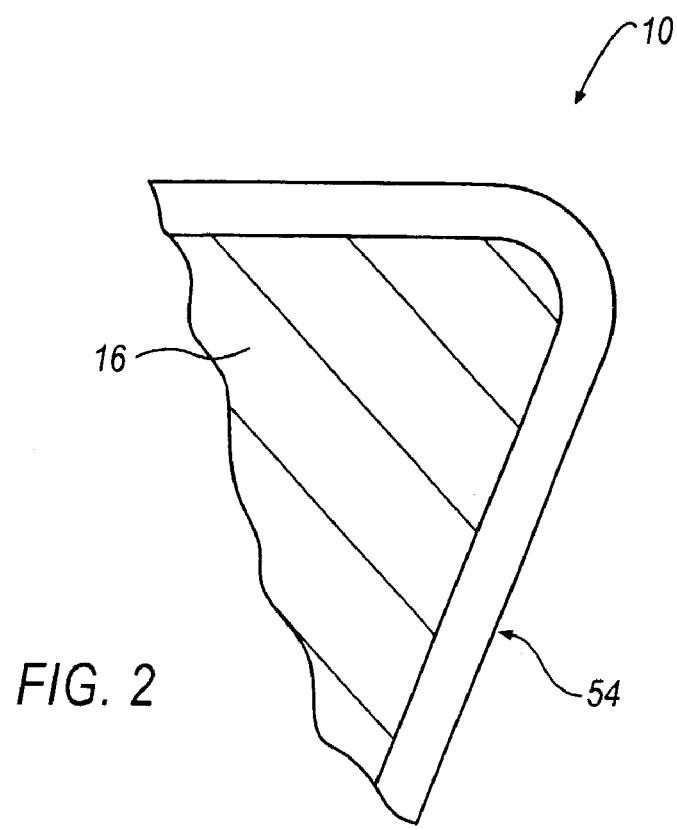
FIG. 2 is a cross-sectional view of the tap of FIG. 1 at the cutting edges illustrating a single monolayer wear resistant coating.

The wear resistant layer 54 can be deposited to the substrate 16 as a single monolayer, or in multiple or alternating layers. FIG. 2 illustrates a wear resistant single monolayer 54 of the aforementioned metal nitrides, carbides, carbonitrides, borides and/or oxides applied to the substrate 16 on all critical areas of the tap 10 including the threads 31, chamfer 30 and flutes 50. It should be realized that the coating is applied to all other areas of the tap 10, except the shank 46 which is masked to prevent it being coated. An example of a coating of a wear resistant single monolayer 54 illustrated in FIG. 2 is titanium carbonitride.

Figure 3:
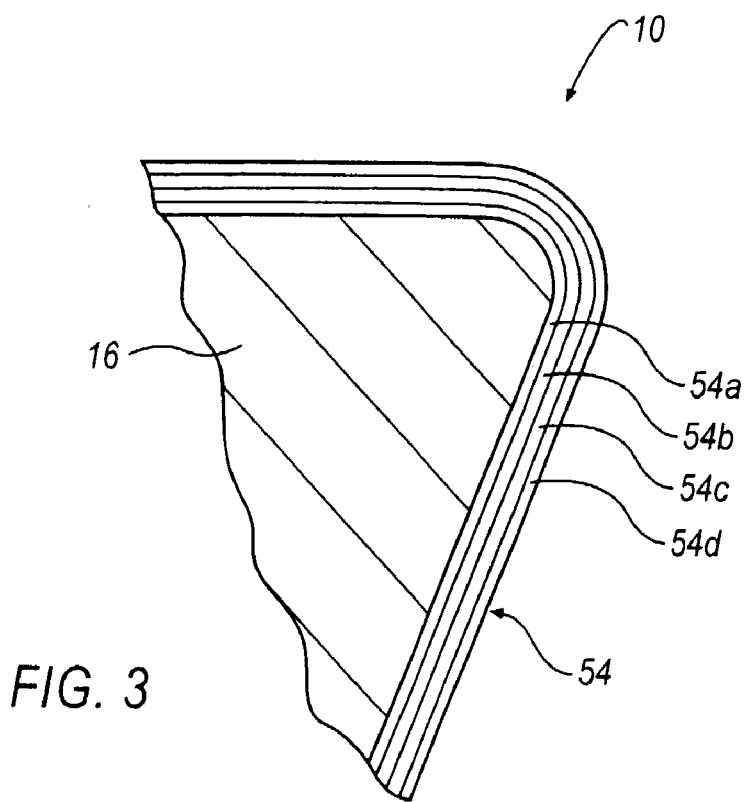
FIG. 3 is a cross-sectional view of the tap of FIG. 1 at the cutting edges illustrating a layer of multiple, or alternating, wear resistant coatings.

FIG. 3 illustrates the substrate 16 whereby the aforementioned metal nitrides, carbides, carbonitrides, borides and/or oxides has been applied to the substrate 16 as multiple or alternating layers 54$a$–$d$. An example of a coating of wear resistant multiple or alternating layers 54$a$–$d$ illustrated in FIG. 3 is titanium nitride and titanium aluminum nitride.

For the purposes of reducing friction, an optional top outer layer 56 may be deposited on the monolayer 54. The outer layer 56 may be comprised of molybdenum disulphide, molybdenum disulphide and transition metals, or any combination thereof, either co-deposited as a single layer or deposited in multiple or alternating layer(s) including layers of carbon, carbon and transition metal carbides, carbon and a transition metal, carbon nitride, or any combination thereof.

Figure 4:
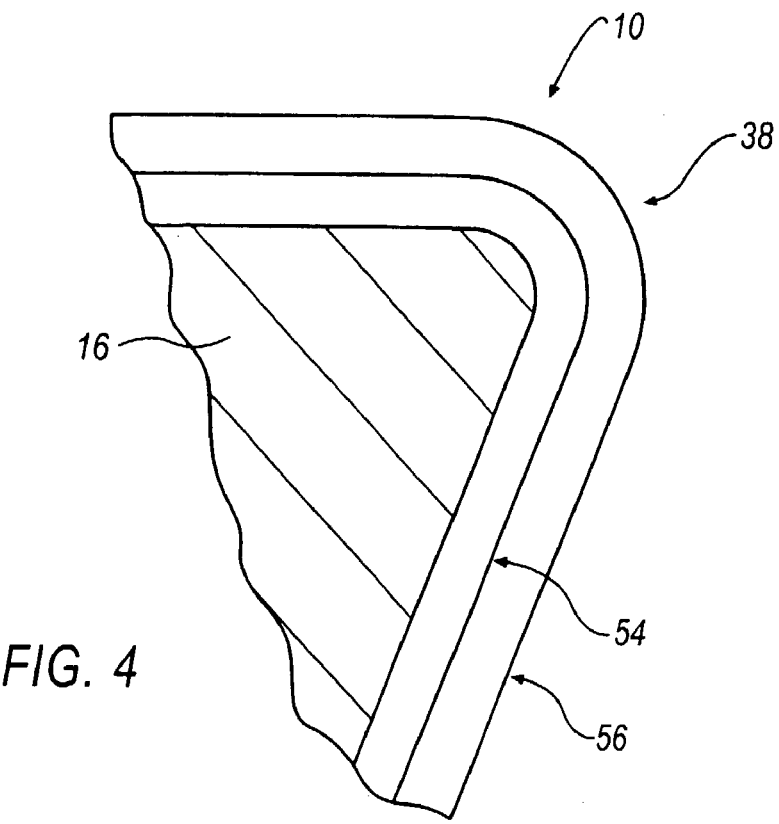
FIG. 4 is a cross-sectional view of the tap of FIG. 1 at the cutting edges illustrating a inner single monolayer wear resistant coating with single monolayer friction reducing outer layer coating.
Figure 5:
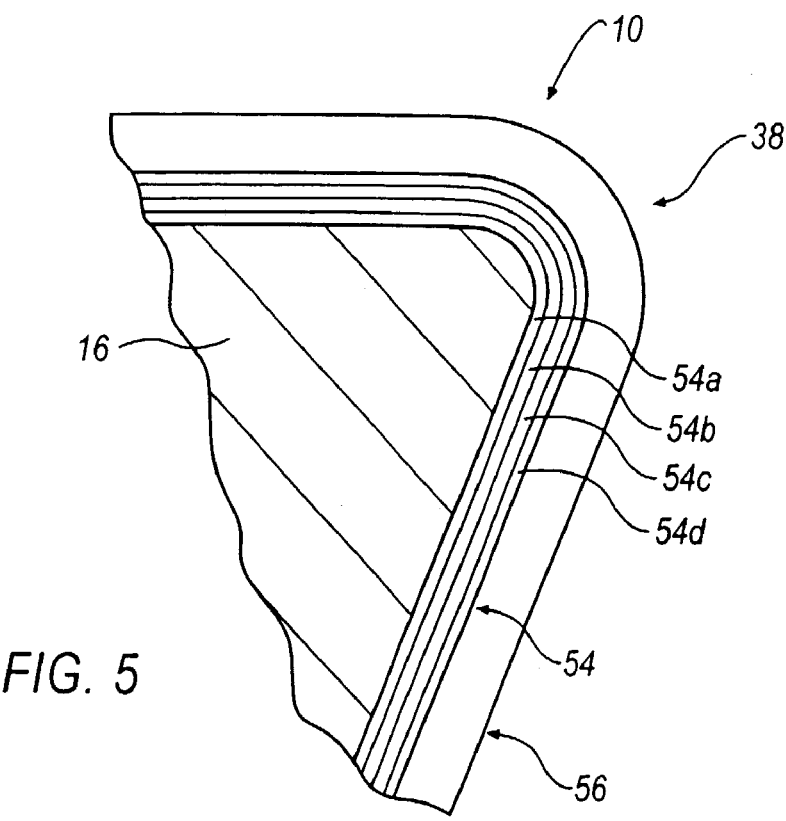
FIG. 5 is a cross-sectional view of the tap of FIG. 1 at the cutting edges illustrating a inner layer of multiple or alternating wear resistant coatings with single monolayer friction reducing outer layer coating.

FIG. 4 illustrates the optional coating of the outer friction reducing layer 56 as a single monolayer applied to a previously deposited wear resistant single monolayer 54 of the aforementioned metal nitrides, carbides, carbonitrides, borides and/or oxides. FIG. 5 illustrates the optional coating of the outer friction reducing layer 56 applied as a monolayer to the previously deposited multiple or alternating layers 54$a$–$d$ of the aforementioned metal nitrides, carbides, carbonitrides, borides and/or oxides. When the coating of the outer friction reducing layer 56 is applied as a single monolayer, the friction reducing layer 56 may be comprised of molybdenum disulphide; co-deposited molybdenum disulphide and transition metals; co-deposited carbon and transition metal carbides; co-deposited carbon and a transition metal; carbon; and carbon nitride. An example of the coating of the outer friction reducing monolayer 56 in FIGS. 4 and 5 is co-deposited molybdenum disulphide and titanium.

Figure 6:
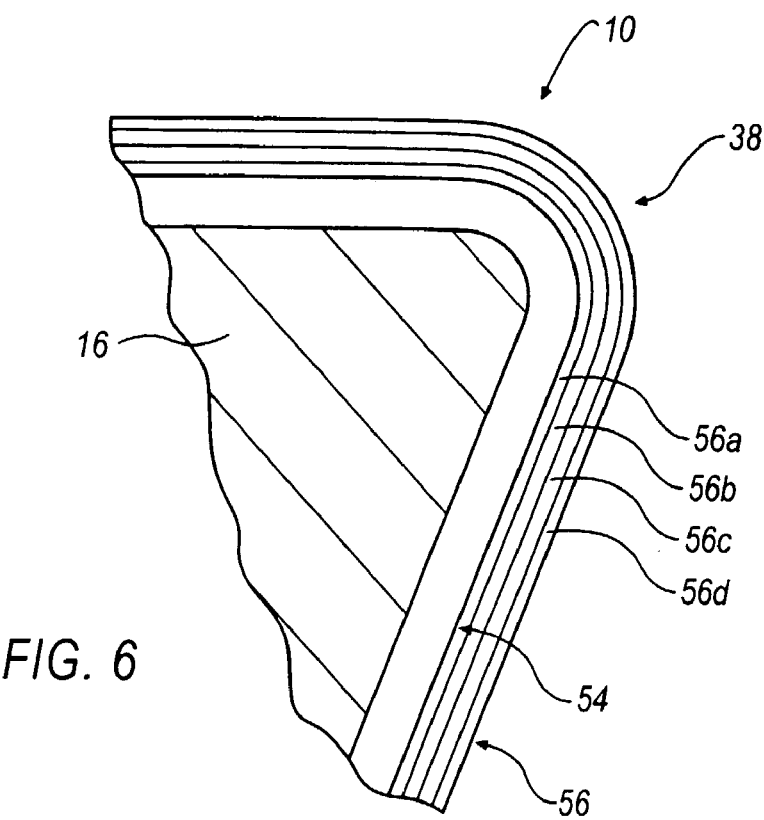
FIG. 6 is a cross-sectional view of the tap of FIG. 1 at the cutting edges illustrating a inner single monolayer wear resistant coating with multiple or alternating friction reducing outer layer coating.
Figure 7:
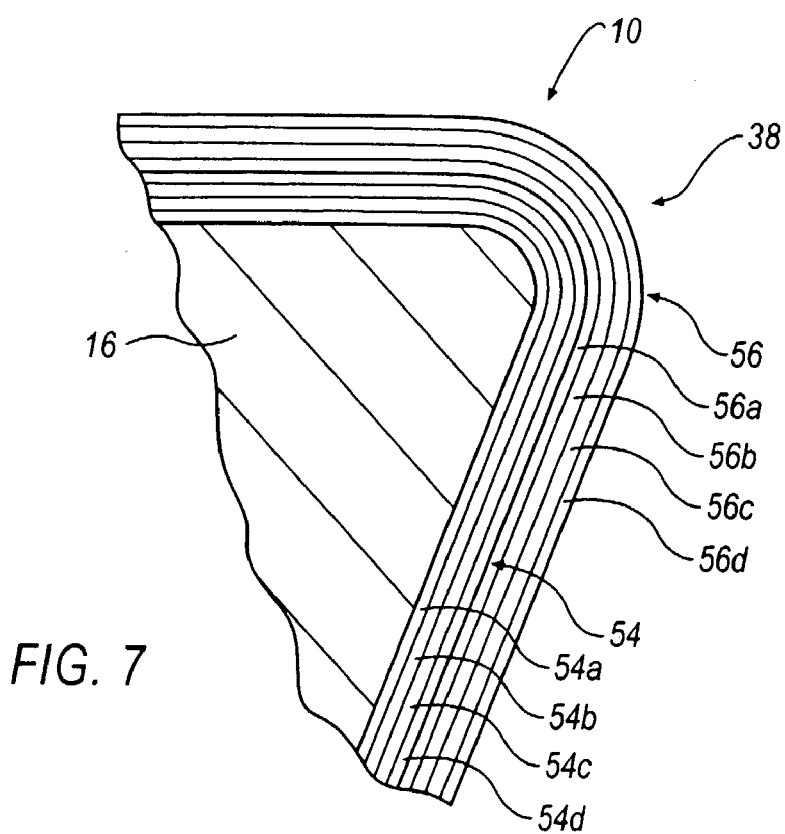
FIG. 7 is a cross-sectional view of the tap of FIG. 1 at the cutting edges illustrating a inner layer of multiple or alternating wear resistant layer coating with multiple or alternating friction reducing outer layer coating.

FIG. 6 illustrates an optional coating of the outer friction reducing multilayer 56$a$–$d$ applied to a previously deposited single monolayer 54 of the aforementioned metal nitrides, carbides, carbonitrides, borides and/or oxides. FIG. 7 illustrates the coating of the outer friction reducing multilayer 56$a$–$d$ applied to a previously deposited multiple layer 54$a$–$d$ of the aforementioned metal nitrides, carbides, carbonitrides, borides and/or oxides. When the outer friction reducing multiple or alternating layers 56$a$–$d$ are applied as multiple layers they may be applied as alternating layers of molybdenum disulphide and transition metals, carbon and transition metal carbides; and carbon and a transition metal. An example of such outer friction reducing multiple or alternating layers 56$a$–$d$ is alternating layers of carbon and chromium.

Both the aforementioned metal nitrides, carbides, carbonitrides, borides and/or oxides, or the aforementioned outer friction reducing layer comprised of molybdenum disulphide; molybdenum disulphide and transition metals; carbon; carbon and transition metal carbides; carbon and a transition metal; and carbon nitrides, may be applied using methods well known in the art, such as physical vapor deposition (PVD) techniques, for example, any high ion density process such as, ion plating, magnetron sputtering, arc evaporation, or the like, or a chemical vapor deposition (CVD) technique by use of a variety of CVD processes that would achieve a satisfactory CVD layer.

It should be realized that the monolayer 54 and/or the multiple or alternating layers 54$a$–$d$ may have varying or graded chemical composition. For example, the coating may start as titanium nitride and then carbon may be later introduced, such that the layer is titanium carbonitride at the surface nearest the outer layer 56. Further, it should be appreciated that the invention is not limited by the number of multiple or alternating layers 54a–d, 56a–d, and that the invention can be practiced with any plurality of multiple or alternating layers. For example, the wear resistant layer 54 may comprise two alternating layers 54a, 54b of titanium nitride and titanium aluminum nitride. In another example, the outer friction reducing layer 56 may comprise two alternating layers 56a, 56b of carbon and chromium.

Figure 8:
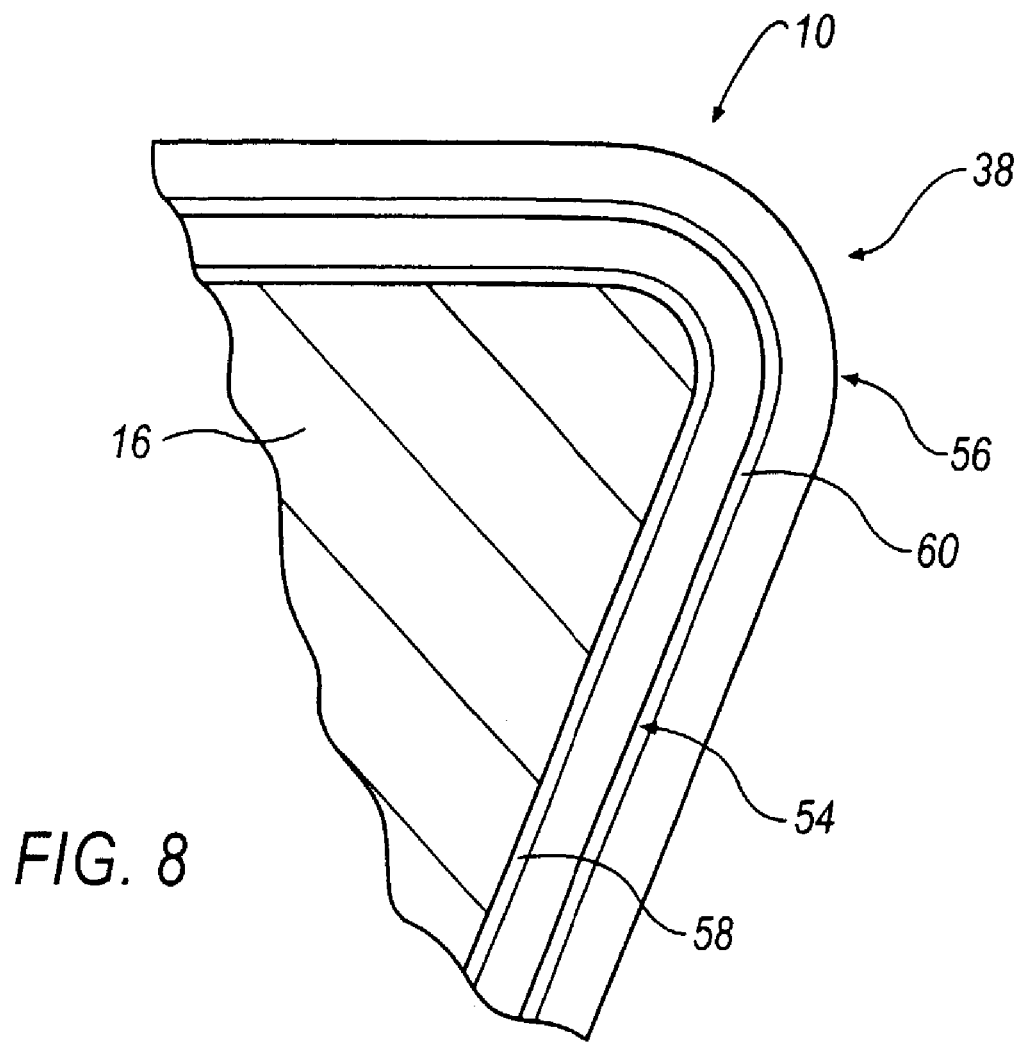
FIG. 8 is a cross-sectional view of the tap of FIG. 1 at the cutting edges illustrating a substrate, an adhesion enhancing layer of metal, an inner wear resistant layer, an adhesion enhancing layer of metal, and a friction reducing outer layer.

For the purpose of enhancing adhesion of the wear resistant layer 54 or layers 54a–d to the substrate 16, a layer 58 of metal may be first applied to the substrate 16, as shown in FIG. 8. Similarly, a layer 60 of metal may be applied between the optional outer friction reducing layer 56 or layers 56a–d and the inner wear resistant layer 54 or layer 54a–d. The adhesion enhancing metal for the layers 58, 60 is selected from one or more of the following: aluminum, silicon and the transition metals from Groups IVa, Va, and VIa of the Periodic Chart.

Tests were conducted to prove the cutting effectiveness of the carbide coated tap of the invention. In one test, a M12×1.25 mm pitch carbide coated tap was tested by tapping 33 HRC AISI 4340 steel at 91 meters per minute (300 feet per minute). The carbide coated tap was manufactured from tungsten carbide grade with 15% cobalt and coated with titanium carbonitride. The test results indicated that the carbide tap produced 1686 threaded holes with little wear, as compared to a conventional TiN coated HSS tap that could only produce 158 holes at the same speed of 91 meters per minute (300 feet per minute). It was also found that only at a reduced speed of 15 meters per minute (50 feet per minute) could the conventional TiN coated HSS tap produce a comparable number of holes.

In another test of the M12×1.25 carbide tap of the invention, we found that the tap of the invention could be used at a speed of 80 meters per minute (262 feet per minute) when tapping JIS SCM440 steel. Currently, tapping SCM440 steel is recommended at a speed of only 14 meters per minute (46 feet per minute) using conventional tapping technology.

The documents, patents and patent applications referred to herein are hereby incorporated by reference.

While the invention has been specifically described in connection with various embodiments thereof, it is to be understood that this is by way of illustration and not of limitation, and the scope of the appended claims should be construed as broadly as the prior art will permit.

What is claimed is:

1. A coated carbide tap, comprising:
a substrate having a threaded section, a flute intersecting said threaded section, and a chamfer, and cutting edges defined at the intersections between said threaded section, said flute and said chamfer, said substrate consisting essentially of tungsten carbide cemented with cobalt in a range between about 14 to 16% by weight and coated with a wear resistant layer consisting of metal nitrides, carbides, carbonitrides, borides and/or oxides,
wherein the metal is chosen from one or more of the following: aluminum, silicon and the transition metals from Groups IVa, Va, and VIa of the Periodic Chart.

2. The coated carbide tap according to claim 1, wherein the wear resistant layer has a varying or graded chemical composition.

3. The coated carbide tap according to claim 1, further comprising a second, outer layer applied to the wear resistant layer for reducing friction.

4. The coated carbide tap according to claim 3, wherein the outer layer is comprised of molybdenum disulphide; molybdenum disulphide and transition metals, or any combination thereof.

5. The coated carbide tap according to claim 3, wherein the outer layer is comprised of carbon, carbon and transition metal carbides, or any combination thereof.

6. The coated carbide tap according to claim 3, wherein the outer layer is comprised of carbon and a transition metal, or any combination thereof.

7. The coated carbide tap according to claim 3, wherein the outer layer is comprised of carbon nitride.

8. The coated carbide tap according to claim 3, wherein the outer layer is co-deposited to form a monolayer or deposited in multiple or alternating layers.

9. The coated carbide tap according to claim 3, further comprising an adhesion enhancing layer deposited between the wear resistant layer of metal nitrides, carbides, carbonitrides, borides and/or oxides and the second, outer layer.

10. The coated carbide tap according to claim 1, wherein the substrate is further comprised of transition metal carbides for restraining grain growth.

11. The coated carbide tap according to claim 1, further comprising an adhesion enhancing layer deposited between said substrate and the wear resistant layer of metal nitrides, carbides, carbonitrides, borides and/or oxides.

12. The coated carbide tap according to claim 1, wherein the layer is co-deposited to form a monolayer or deposited in multiple or alternating layers.

13. A coated carbide tap, comprising:
a substrate having a threaded section, a flute intersecting said threaded section, and a chamfer, and cutting edges defined at the intersection between said threaded section, said flute, and said chamfer, said substrate consisting essentially of tungsten carbide cemented with cobalt in a range between about 14 to 16% by weight and a coated with a wear resistant layer consisting of metal nitrides, carbides, carbonitrides, borides and/or oxides,
wherein the metal is chosen from one or more of the following: aluminum, silicon and the transition metals from Groups IVa, Va, and VIa of the Periodic Chart, and
wherein the wear resistant layer has a varying or graded chemical composition.

14. The coated carbide tap according to claim 13, further comprising a second, outer layer applied to the wear resistant layer for reducing friction.

15. The coated carbide tap according to claim 14, wherein the outer layer is comprised of molybdenum disulphide; molybdenum disulphide and transition metals, or any combination thereof.

16. The coated carbide tap according to claim 14, wherein the outer layer is comprised of carbon, carbon and transition metal carbides, or any combination thereof.

17. The coated carbide tap according to claim 14, wherein the outer layer is comprised of carbon and a transition metal, or any combination thereof.

18. The coated carbide tap according to claim 14, wherein the outer layer is comprised of carbon nitride.

19. The coated carbide tap according to claim 14, wherein the outer layer is co-deposited to form a monolayer or deposited in multiple or alternating layers.

20. The coated carbide tap according to claim 13, wherein the substrate is further comprised of transition metal carbides for restraining grain growth.

* * * * *